United States Patent [19]

Kelleher

[11] Patent Number: 5,124,739
[45] Date of Patent: Jun. 23, 1992

[54] REAL TIME PSEUDOFOCUS EXPOSURE CONTROL SYSTEM

[75] Inventor: John J. Kelleher, Chelmsford, Mass.

[73] Assignee: Polaroid Corporation, Cambridge, Mass.

[21] Appl. No.: 609,401

[22] Filed: Nov. 5, 1990

[51] Int. Cl.⁵ ............................................. G03B 15/03
[52] U.S. Cl. .................................... 354/413; 354/420; 354/436
[58] Field of Search ............... 354/402, 403, 435, 436, 354/437, 439, 440, 441, 442, 443, 415, 195.1, 420

[56] References Cited

U.S. PATENT DOCUMENTS

| | | | |
|---|---|---|---|
| 4,362,372 | 12/1982 | Kiesel | 354/195.1 |
| 4,459,005 | 7/1984 | Harvey | 354/403 |
| 4,727,389 | 2/1988 | Raschke | 354/402 |
| 4,785,323 | 11/1988 | Bell | 354/443 |
| 4,894,678 | 1/1990 | Farrington et al. | 354/415 |

Primary Examiner—Russell E. Adams
Attorney, Agent, or Firm—John J. Kelleher

[57] ABSTRACT

A fixed focus lens, scanning aperture, electronic flash camera is provided with an exposure control system of substantially reduced complexity for improving the clarity of sharpness of an image of subjects located closer to the camera than the near distance of the camera lens's normal depth of field.

8 Claims, 4 Drawing Sheets

REAL TIME PSEUDOFOCUS EXPOSURE CONTROL SYSTEM

BACKGROUND OF THE INVENTION

1. Field of the Invention

The present invention relates to an exposure control system for a fixed focus lens camera of the type that forms a subject image through a scanning aperture, in general, and to such a system that includes a simplified arrangement for determining if the subject is within or outside of the lens's normal depth of field for exposure control purposes, in particular.

2. Description of the Prior Art

It is well known that the sharpness of an image formed by a lens at an image plane is primarily dependent upon the exactness of focus of the image at the image plane. When a lens is focused to produce a sharp image of a particular object at the image plane, other objects that are closer or further away do not appear equally sharp. The decline in sharpness is gradual and there is a spacial zone extending in front of and behind the focused subject where the image misfocus is too small to be noticeable and therefore can be accepted as sharp. This zone is commonly referred to as the depth of field of the lens.

The initial photographic cameras only employed lenses of the fixed focus type. In order to form photographic images of acceptable sharpness with such lenses over the greatest possible range of subject distances, their optical characteristics had to be chosen such that the near distance of their depth of field could only extend to within approximately 4 to 5 feet of the camera for an f/14 lens, if images of distant objects (objects at infinity) were to have an acceptably sharp focus at the camera's film plane. An image of an object produced by this type of lens that is located closer to the camera than this near distance would appear blurred or noticeably out of focus.

The production of sharp images of distant as well as relatively close objects is not a problem with an adjustable focus lens. With such a lens, the focus distance and its associated depth of field can be adjusted to produce acceptably sharp images of objects located at virtually any object distance. While an adjustable focus lens has many advantages, including the just-mentioned ability to vary its depth of field, such a lens has certain disadvantages. Among the disadvantages are its cost and the increased susceptibility to mechanical failure over that of a fixed focus lens.

An electronic flash, fixed focus lens camera that is capable of forming sharp images of objects located closer to the lens than the near distance of its normal depth of field, has been disclosed. In Harvey U.S. Pat. No. 4,459,005 Harvey, for example, exposure control apparatus for an electronic flash, fixed focus lens camera includes means for controlling exposure with either of two predetermined apertures. The apparatus includes proximity sensing means for detecting when a subject to be photographed is within a given distance of the camera and a mechanism for restricting the exposure aperture to a size that is less than the aperture size the exposure control mechanism would normally employ when the subject is within the aforementioned given distance. The proximity sensing means includes a light emitting diode for illuminating a subject to be photographic with infrared (IR) light and a sensor for measuring subject IR reflectivity. A major disadvantage inherent in this type of electronic flash exposure control apparatus is that for some subject distances, subject reflectivities, and ambient scene light conditions, the selected aperture size may be small enough to produce a photograph with a sharp subject image but may be too small to produce an adequately exposed subject background. For other such conditions, the selected aperture size may be large enough to produce a photograph with an adequately exposed subject background but too large to produce a subject image of acceptable sharpness.

An electronic flash, fixed focus lens, scanning aperture camera that is capable of forming sharp images of subjects located closer to the camera than the near distance of the lens's normal depth of field has also been disclosed in U.S. patent application Ser. No. 07/414,267, filed Sep. 29, 1989 by Coltman et al., in common assignment wherewith. The camera disclosed therein is capable of automatically forming sharp images of such close subjects over a wider range and a greater number of subject distances than was theretofore possible. These close subject images are formed by firing the electronic flash at the smallest possible aperture for optimum image sharpness and overall scene exposure as a function of scene brightness and of subject IR reflectivity levels. While the exposure control system described in the Coltman et al. application is quite effective in forming sharp and well exposed images of such relatively close subjects and their associated scene backgrounds, the exposure control system requires a memory function for storing subject reflectivity or range related subject distance data obtained immediately prior to an exposure interval, for use during the exposure interval. This storage requirement necessarily increases exposure control system cost and complexity.

SUMMARY OF THE INVENTION

In accordance with a preferred embodiment of the present invention an electronic flash, fixed focus lens, scanning aperture camera which improves the clarity or sharpness of an image of subjects located closer to the camera than the near distance of the camera lens's normal depth of field is provided with an exposure control system of substantially reduced complexity. The exposure control system comprises simplified means for determining if a subject to be photographed is located either within or closer to the camera than said normal depth of field. In operation the exposure control system causes the electronic flash to illuminate the scene once or twice during an exposure interval to determine the presence or absence of such close subjects and for subject image forming purposes. Scene illumination for close subject image forming purposes occurs while the size of the scanning aperture is smaller than any aperture size employed when a subject is located within the lens's normal depth of field, in order to increase the lens's depth of field and thereby improve the image sharpness of such close subjects. Subjects located within the lens's normal depth of field are illuminated in a conventional manner, during an exposure interval, at significantly larger aperture sizes.

It is a primary object of the present invention therefore, to provide an electronic flash, fixed focus lens, scanning aperture camera of substantially reduced complexity, that is capable of making sharp photographic images of subjects located closer to the camera than the near distance of the camera lens's normal depth of field.

It is another object of the present invention to provide a readily adaptable modification for an existing exposure control system of an electronic flash, fixed focus lens, scanning aperture camera that will allow the camera to make sharp photographic images of subject located closer to the camera than was previously possible.

It is a further object of the present invention to provide an exposure control system for an electronic flash, fixed focus lens, scanning aperture camera that is capable of making sharp photographic images of subject located closer to the camera lens's normal depth of field that will have a reduced information storage or memory requirements.

Other objects, features and/or advantages of the present invention will be readily apparent from the following detailed description of a preferred embodiment thereof when taken in conjunction with the accompanying drawings.

DETAILED DESCRIPTION OF THE PREFERRED EMBODIMENT

Figure 1:
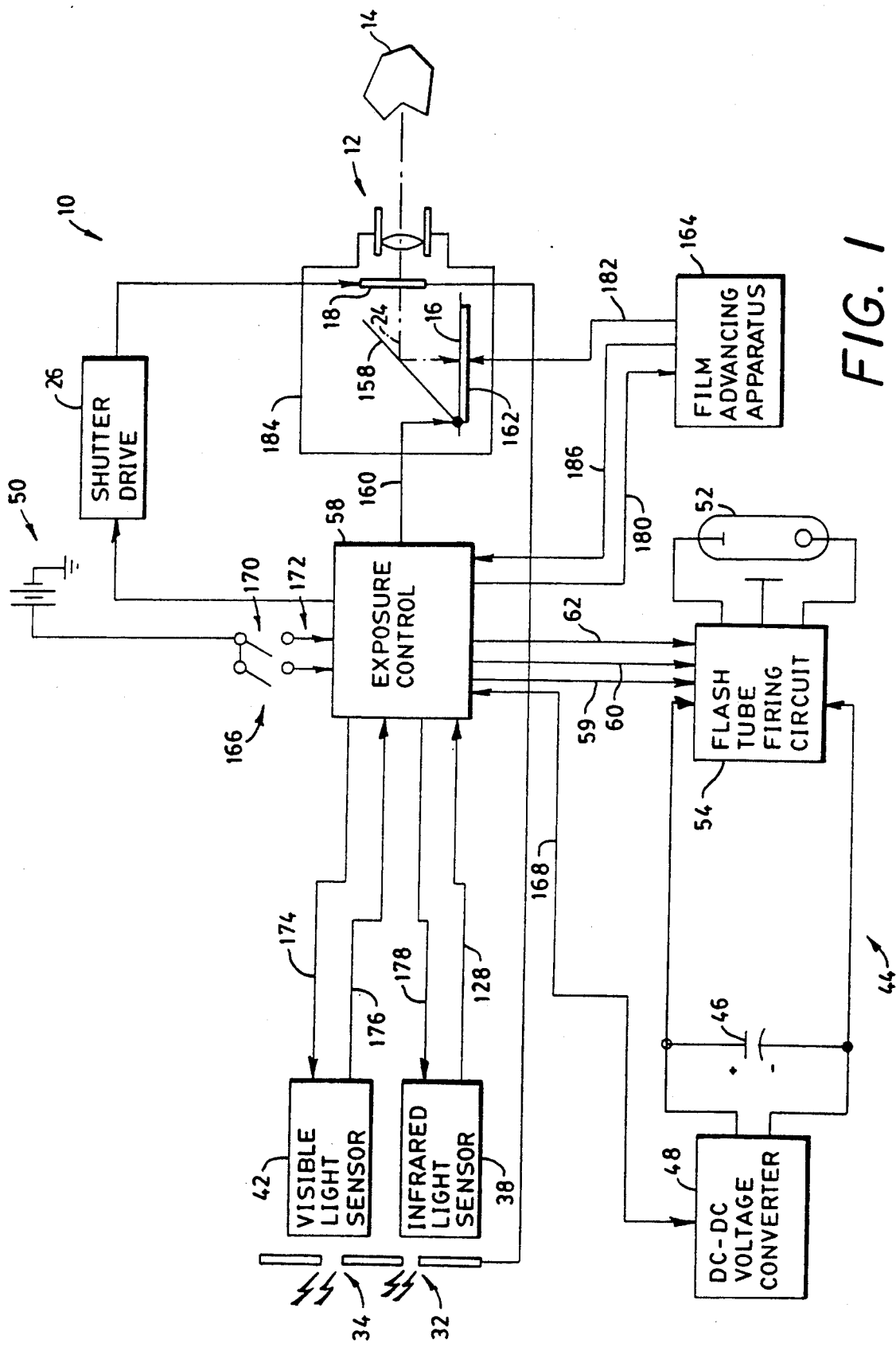
FIG. 1 is a schematic diagram of an electronic flash camera which incorporates a preferred embodiment of the reduced complexity exposure control system of the present invention.

Referring now to the drawings, and specifically to FIG. 1, there is shown a fixed focus lens, scanning aperture, single lens reflex (SLR), electronic flash camera 10, of the self-developing type, which incorporates a preferred embodiment of the reduced complexity, exposure control system of the present invention. The camera 10 includes an objective lens 12, of the fixed focus type, that may include one or more elements (only one shown) for focusing image-carrying light rays of, for example, an object 14 on a film plane 16.

Figure 2A:
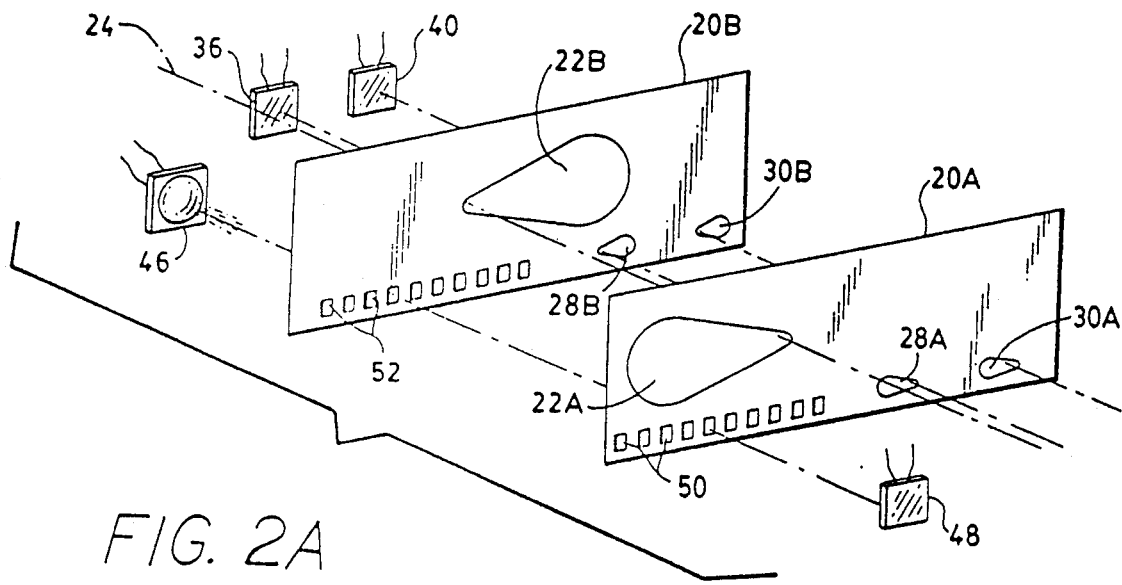
FIG. 2A is an exploded perspective view of a scanning type shutter blade mechanism which is also schematically shown in FIG. 1.
Figure 2B:
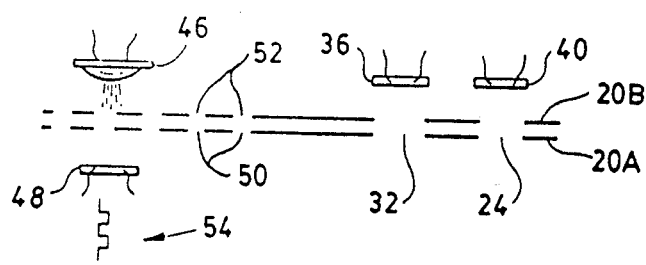
FIG. 2B is an unexploded top view, partly in section, of the scanning type shutter blade mechanism of FIG. 2A.

With additional reference to FIGS. 2A and 2B, the blade mechanism 18, positioned intermediate the lens 12 and the film plane 16, includes a pair of overlapping shutter blade elements 20A and 20B of the "scanning" type. Scene light admitting primary apertures 22A and 22B, are respectively provided in the blade elements 20A and 20B to cooperatively define a progressive and predictable variation of effective aperture openings in accordance with simultaneous displacement of one blade element with respect to the other blade element in a manner more fully described in commonly assigned Whiteside U.S. Pat. No. 3,942,183, now specifically incorporated herein by reference. The blade element apertures are selectively shaped and positioned so as to overlie the central optical axis 24 of the lens 12 thereby defining a gradually varying effective aperture size as a function of the position of the blades of the blade mechanism 18.

A shutter drive 26 is provided for displacing the blade elements 20A and 20B of the blade mechanism 18. The shutter drive 26 includes a tractive electromagnetic device in the form of a solenoid (not shown) employed to displace the shutter blade elements with respect to one another in a manner more fully described in the above-cited Whiteside patent. When actuated by the shutter drive 26 to generate an exposure interval, the aperture formed by the shutter mechanism 18 changes, as a function of time, in a known and quite predictable manner. The size of the aperture at any point in time during an exposure interval can be determined in a conventional manner by, for example, knowing the amount of time that has elapsed from the time that the shutter mechanism is initially actuated to generate an exposure interval, to a particular point in time relating to a corresponding aperture size.

Each of the blade elements 20A and 20B of the blade mechanism 18 includes two secondary apertures 28A, 30A and 28B, 30B, respectively. The aperture 28A in the blade 20A cooperates with the aperture 28B in the blade 20B to form an opening 32 and the aperture 30A in blade 20A cooperates with aperture 30B in blade 20B to form an opening 34 through the shutter mechanism 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 22A and 22B is controlled by a signal generated by a combination of an infrared photosensitive element 36 and an integrator (not shown) within an infrared sensor 38 that senses and integrates a corresponding amount of infrared scene energy through the opening 32. The amount of ambient scene light admitted to the film plane 16 through these primary apertures is controlled by a signal generated by a combination of a visible light photosensitive element 40 and an integrator (not shown) within a visible light sensor 42 that senses and integrates a corresponding amount of visible ambient scene light, through the opening 34. An example of scanning blade elements having primary and secondary apertures that cooperate to control the amount of scene light admitted to a film plane is shown in U.S. Pat. No. 3,942,183, above.

The camera 10 is also provided with an electronic flash apparatus 44 together with apparatus for controlling its energization in order to determine subject reflectivity for subject distance or range related reasons and to provide a portion of the exposure value required to illuminate a scene to be photographed. The electronic flash apparatus 44 comprises a main storage capacitor 46 which may be charged up to an operating voltage by any conventional voltage converter circuit (not shown) which would be included within a DC-DC voltage converter 48. The DC-DC voltage converter 48 operates in a conventional manner to convert a DC voltage as may be derived from a battery 50 of the camera 10, which can be in the order of 6 volts, to a suitable operating voltage such as 280 volts. A flash tube 52 of the electronic flash apparatus 44 is electrically coupled to the main storage capacitor 46 by a flash tube firing circuit 54. The details of the firing circuit 54 will be described below with respect to FIG. 3. The flash tube firing circuit 54 is, in turn, coupled to an exposure control 58 that generates flash enabling, firing and terminating commands on the output paths 59, 60 and 62, respectively, that controls the enabling of and when and for how long the flash tube 52 illuminates a subject to be photographed with visible and infrared light. The flash tube firing circuit 54 will now be described in detail.

Figure 3:
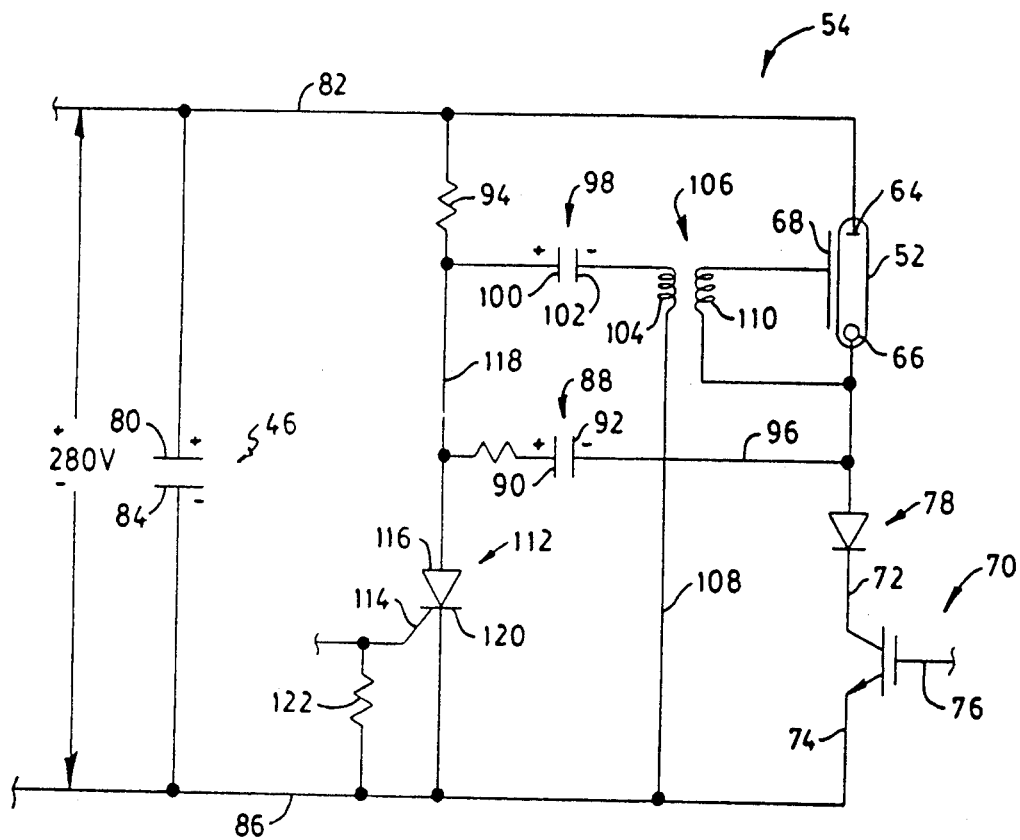
FIG. 3 is a detailed schematic diagram of an electrical circuit for controlling the light output of the flash tube in the electronic flash camera of FIG. 1.

As shown in FIG. 3, the flash tube firing circuit 54 is coupled to the electronic flash tube 52 having an anode 64 a cathode 66 and a trigger electrode 68. The flash tube 52 is preferably a conventional flash tube having relatively high resistance. The firing circuit 54 includes an insulated gate bipolar transistor or IGBT 70, such as that which is available from the Mitsubishi Electric Corporation of Tokyo, Japan, having a collector terminal 72, an emitter terminal 74 and a gate terminal 76. The cathode 66 of the flash tube 52 is connected to the collector terminal 72 of the IGBT 70 through a blocking diode 78. The anode 64 of the flash tube 52 is connected to a positively charged electrode 80 of the main storage capacitor 46 through a path 82 and the emitter terminal 74 of the IGBT 70 is connected to a negatively charged electrode 84 of the main storage capacitor 46 through a path 86.

A voltage doubler capacitor 88 is connected between the positively and negatively charged electrodes 80 and 84, respectively, of the main storage capacitor 46. The doubler capacitor 88 includes an electrode 90 and an electrode 92. The electrode 90 is connected to the positively charged electrode 80 of the main storage capacitor 46 through a resistor 94 and the path 82, and the electrode 92 is connected to the negatively charged electrode 84 of the main storage capacitor 46 through the path 96, the blocking diode 78, the IGBT 70 when in its conductive state and the path 86.

A trigger capacitor 98 is also connected between the positively and negatively charged electrodes 80 and 84, respectively, the main storage capacitor 46. The trigger capacitor 98 includes a positively charged electrode 100 and a negatively charged electrode 102. The electrode 100 is connected to the positively charged electrode 80 of the main storage capacitor 46 through the resistor 94 and the path 82, and the electrode 102 is connected to the negatively charged electrode 84 of the main storage capacitor 46 through a primary winding 104 of a step-up transformer 106, a path 108 and the path 86. The trigger electrode 68 of the electronic flash tube 52 is connected to the cathode 66 of the flash tube 52 through a secondary winding 110 of the step-up transformer 106.

A silicon controlled rectifier or SCR 112 having a gate electrode 114 is also connected between the positively and negatively charged electrodes 80 and 84, respectively, of the main storage capacitor 46. A cathode 116 of the SCR 112 is connected to the electrode 80 through a path 118, the resistor 94 and the path 82. An anode 120 of the SCR 112 is connected to the electrode 84 through the path 86. In addition, the gate electrode 114 of the SCR 112 is connected to the electrode 84 of the main storage capacitor 46 through a bias resistor 122 and the path 86.

Figure 4:
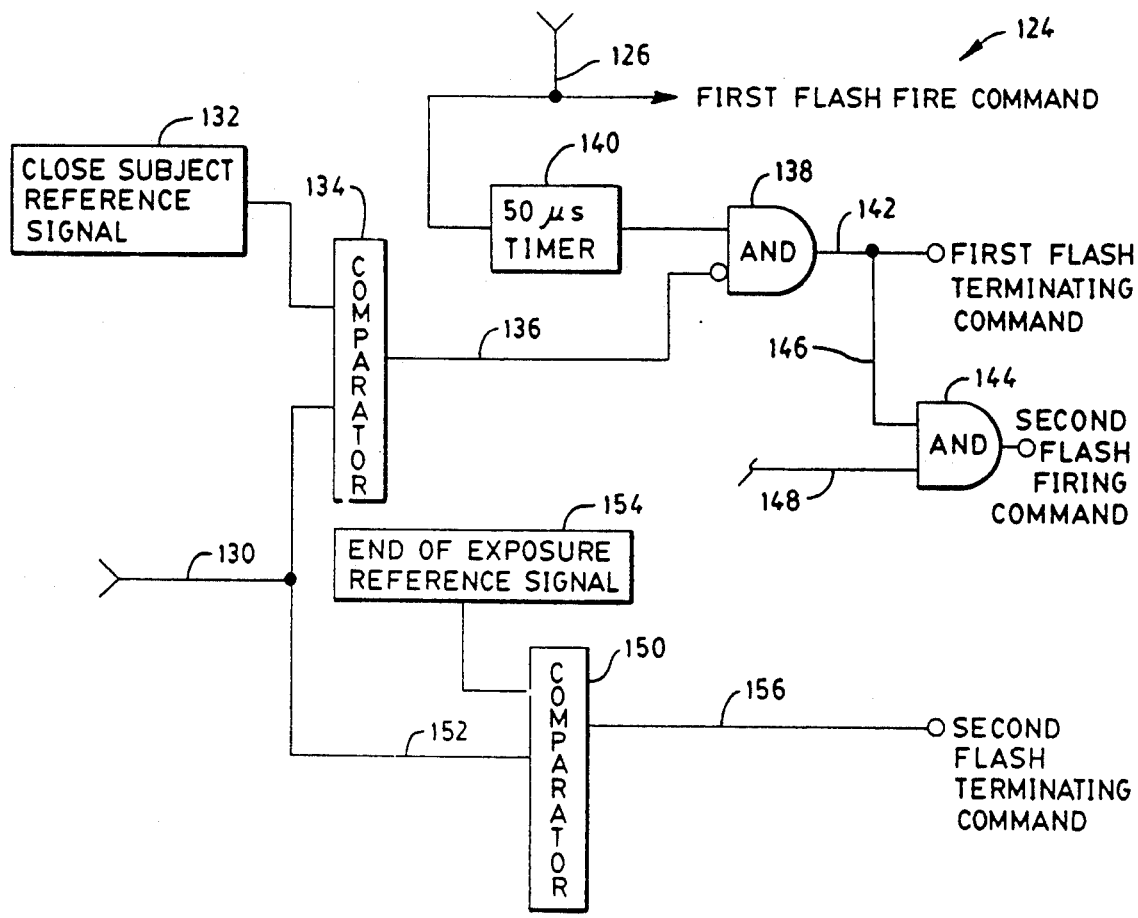
FIG. 4 is a schematic diagram of an electrical circuit for controlling the number of scene illuminating flashes of light that are generated by the electronic flash camera of FIG. 1 during an exposure interval.
Figure 5:
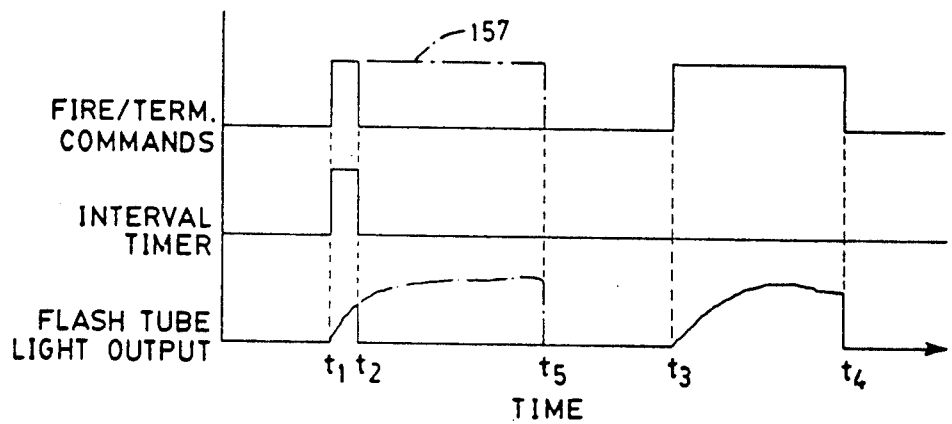
FIG. 5 is a graph of the firing sequence of the electronic flash in the camera of FIG. 1, as a function of time, during an exposure interval.

The exposure control 58 includes, in part, a logic circuit 124 as shown in FIG. 4 for determining if a subject to be photographed is located within a range of distances which are closer to the camera 10 than the near distance of the normal depth of field of the fixed focus lens 12 (i.e. between two and four feet). If such a close subject is detected, the logic circuitry of FIG. 4 causes the flash tube 52 to operate in a close-subject mode and not in its normal mode of operation. FIG. 5 is a graph of the firing sequence of the flash tube 52 during such close-subject and normal modes of operation.

With additional reference to FIGS. 4 and 5, a camera operator generated flash firing sequence initiating command is applied to the logic circuit 124 within the exposure control 58 at a time $t_1$ through a path 126. This flash sequence initiating command causes the exposure control 58 to transmit a flash enable command to the gate terminal 76 of the IGBT 70 within the flash tube firing circuit 54 on a path 59 causing the IGBT 70 to conduct and thereby cause the voltage doubler capacitor 88 to be charged to the potential of the main storage capacitor 46. The trigger capacitor 98 being connected across the main storage capacitor 46 has already been charged to this same level. Subsequent thereto, this flash firing sequence initiating command also causes a first flash firing command to be applied to the flash tube firing circuit 54 (FIGS. 1 and 3) through the path 60 and to the gate electrode 114 of the SCR 112 to initiate flash tube 52 firing. The infrared component of the artificial light generated by the flash tube 52 and reflected from a scene to be photographed is sensed by the infrared sensor 38, and a signal representative of its magnitude or intensity is routed to the exposure control 58 through a path 128 (FIG. 1) and then to the logic circuit 124 on a path 130.

The logic circuit 124 includes a permanently stored close-subject reference signal 132 which is representative of a subject that is assumed to be located between two and four feet from the camera 10 or at a distance that is closer to the camera 10 than the near distance of the normal depth of field of the fixed focus lens 12. A comparator 134 compares the reflected IR light or the reflectivity signal on the path 130 with this stored close-subject reference signal 132. If the reflectivity signal equals or exceeds the magnitude of the close-subject reference signal 132, as determined by the comparator 134 a close-subject detect signal is thereby generated on the path 136 and at one of the inputs to an AND gate 138.

At the same time that the camera operator generated flash firing sequence initiating command causes a first flash firing command to be applied to the logic circuit 124 through the path 126, this same sequence initiating command is applied to the input of a 50 microsecond interval timer 140 to initiate the time-out thereof. At the end of a 50 microseconds time interval the output of the timer 140 is applied to another input of the AND gate 138. If a close-subject detect signal is not generated at the output of the comparator 134 within 50 microseconds, the AND gate 138 becomes satisfied and a first flash terminating command is generated at a time $t_2$ at the output 142 thereof. This first flash terminating command is applied to the flash firing tube circuit 54 through the path 62 and to the gate 76 of the IGBT 70 included therein to thereby cause the extinguishing of the light output of the flash tube 52. The generation of the first flash terminating command at the output 142 of the AND gate 138 causes the operating mode of the flash tube 52 to change from its just described close-subject mode of operation to its normal mode operation wherein it illuminates subjects, in a conventional manner, located within the normal depth of field of the fixed focus lens 12. When the operating mode of the flash tube 52 is changed form its close-subject mode to its normal mode of operation, the first flash terminating command appearing at the output 142 of the AND gate 138 is also applied to one input of an AND gate 144 through a path 146 thereby enabling the AND gate 144. The normal flash mode flash firing command is generated by a circuit (not shown) within the exposure control 58, in a conventional manner, a predetermined time after a scene light admitting aperture is formed by the shutter mechanism 18. This second flash firing command generated within the exposure control 58 at a time $t_3$ is applied to another input of the enabled AND gate 144 through a path 148 and then to the flash tube firing circuit 54 and the gate electrode 114 of the SCR 112 included therein through the path 60 to initiate a second firing of the flash tube 52, within the same exposure interval.

The signal representative of subject reflectivity appearing on the path 130 is also applied to one input of a comparator 150, on a path 152. An end of exposure reference signal 154, representative of a scene light level that will produce a properly exposed photograph, is applied to another input of the comparator 150. When the magnitude of the subject reflectivity signal equals or exceeds the end of exposure reference signal 154, as determined by the comparator 150, a second flash terminating command is generated by the comparator 150 or a path 156 at a time $t_4$ which is routed to the flash tube firing circuit 54 and to the gate electrode 76 of the IGBT 70 through the path 62 to thereby terminate the second firing of the flash tube 52 within the exposure interval.

Alternatively, if a close-subject detect signal is generated at the output of the comparator 134 before the interval timer 140 times out, the AND gate 138 is disabled thereby preventing the generation of a first flash terminating command at the output thereof on the path 142. As a consequence, the flash firing command to the flash tube 52 initiated at the time $t_1$ continues, as illustrated by the line 157 in FIG. 5, until the time $t_5$ where it is terminated, for example, in the same manner that the above-described second firing of the flash tube 52 was terminated at the time $t_4$.

As noted above, the camera 10 is of the SLR type and therefore includes a conventional reflex mirror 158 that is actuatable by the exposure control electronics module 58 through a path 160. The mirror 158 is actuatable, in a conventional manner, between a viewing position where it blocks the transmission of scene light to the film plane 16 and where a camera operator can view a scene to be photographed through the lens 12, and a taking or unblocking position as shown in FIG. 1, where it facilitates the transmission of scene light to the film plane 16 during an exposure interval.2

The camera 10 is preferably designed for use with a self-developing flim unit (not shown) similar to those described in U.S. Pat. No. 3,415,644 to Land, in common assignment herewith, and is specifically incorporated herein by reference. The self-developing flim unit is packaged in a lighttight film cassette 162 shown in the condition assumed just after the cassette 162 has been fully inserted into the camera 10. The cassette 162 may enclose the 6 VDC battery 50.

Mounted wtihin the camera 10 is a film advancing apparatus 164 similar to that described in U.S. Pat. No. 3,753,392 to Land that includes a motor for operating a gear train (neither shown) which is coupled with the film advancing apparatus 164 to provide for the continuous movement of an exposed film unit from an exposure position within the camera 10 toward the exterior thereof. The film advancing apparatus 164 additionally includes a flim-engaging arm member (not shown) driven by the above-mentioned motor and gear train. The arm member is adapted to extend into a slot in the cassette 162, as shown in the above-noted Land '392 patent, and engage the uppermost film unit located therein at or near its trailing edge prior to moving it out of the cassette 162. The exposed film unit is subsequently moved into the bit of a pair of conventional processing rollers (not shown). The processing rollers, which are rotated by the motor and gear train mentioned above, continue the uninterrupted movement of the exposed film unit toward the exterior of the camera 10 while simultaneously rupturing a container of processing liquid at the leading end of the exposed film unit. The processing rollers spread the liquid contents of the ruptured container between elements of the film unit to initiate formation of a visible image within the film unit in a manner that is well-known in the art.

OPERATION

A typical exposure cycle will now be described in detail. For the purpose of this description it is assumed that the taking aperture of the blade mechanism 18 is in its full open position, that the openings 32 and 34 formed by the secondary apertures in the blade mechanism 18 are also fully opened, that the mirror 158 is in its viewing or light blocking position, that the flash apparatus 44 has been energized by the prior closure of a swich 166 which coupled the battery 50 to the DC-DC voltage converter 48 through the exposure control 58 and a path 168 and that the main storage capacitor 46 is fully charged and is ready for the initiation of an exposure cycle.

With reference to FIGS. 1 through 5 of the drawings, a switch 170 is actuated to a closed position by a camera operator to initiate the exposure cycle. The closure of the switch 170 couples the battery 50 to the exposure control 58 through a path 172. With the blade mechanism opening 34 formed by the secondary apertures 30A and 30B adjacent the visible light sensor 42 in its full open position, the exposure control 58 enables the visible light sensor 42, through a path 174, to integrate ambient visible light for a fixed period of time and then send the integrated value back to the exposure control 58 through a path 176 for storage therein.

The exposure control 58 then energizes the shutter drive 26 to actuate the blade mechanism 18 and therefore the taking aperture together with the opening 32 formed by the secondary apertures 28A and 28B and the opening 34 formed by the secondary apertures 30A and 30B to their fully closed positions. When the openings 32 and 34 are moved to their fully closed positions, the exposure control 58 actuates means (not shown) for moving the mirror 158 from the viewing or light blocking position where it precludes the transmission of image-carrying light rays to the film plane 16, to its light unblocking position (as shown in FIG. 1) where it facilitates the transmission of image-carrying light rays to the film plane 16 during an exposure interval. The shutter drive 26, in response to a command from the exposure control 58, then actuates the shutter mechanism 18 to initiate an exposure interval.

The exposure control 58 transmits an infrared light sensor 38 enable signal through a path 178 thereby enabling the sensor 38 to integrate infrared scene light. In addition, the exposure control 58 also transmits a flash enable signal to the flash tube firing circuit 54 on the path 59. A predetermined time after first light, i.e. after an aperture is initially formed in the shutter mechanism 18 which will admit scene light to the film plane 16, the exposure control 58 transmits a first flash firing command to the flash tube firing circuit 54 on the path 60 at the time $t_1$, as previously explained, thereby causing the flash tube 52 to illuminate the scene with a first pulse of artifical light.

The enabled infrared light sensor 38 will sense any infrared light reflected from a subject within the scene to be photographed and transmit a signal representative thereof to the exposure control 58 on the path 128 and on the path 130 of the logic circuit 124 included therein. If infrared light is not sensed by the infrared light sensor 38 with 50 microseconds from the time that the exposure control 58 transmits the first flash firing command to the flash tube firing circuit 54 at the time $t_1$, the logic circuit within the exposure control 58 will cause a first flash terminating command to be applied to the flash firing circuit 54, in the above-described manner and thereby extinguish the light output of the flash tube 52 at the time $t_2$. Failure to detect a first pulse of light reflection of infrared light from the scene within this period of time indicates the absence of any subjects within the scene which are located closer to the camera 10 than the near distance of the normal depth of field of the fixed focus lens 12. If the light output of the flash tube 52 is extinguished because of the failure to detect the presence of such a close subject, a second flash firing command and a second flash terminating command are applied in a conventional manner to the flash tube firing circuit 54 on the path 60 and 62 at time $t_3$ and $t_4$, respectively, in the above-mentioned conventional manner to thereby illuminate the scene with the appropriate amount of supplemental artifical illuminations for the subject being photographed, during the remaining portion of the exposure interval.

Alternatively, if infrared light is sensed by the infrared light sensor 38 within the above-described 50 microsecond time interval indicating the presence of a subject that is closer to the camera 10 than the near distance of the normal depth of field of the fixed focus lens 12, the logic circuit 124 continues the first pulse of illumination from the time $t_1$ until the time $t_5$ and subsequently causes the flash tube firing circuit 54 to extinguish the light output of the flash tube 52 at same time $t_5$ in the same manner that the above-described second pulse of scene-illuminating artificial light was extingusihed at the time $t_4$ when no such close subject was detected.

At the completion of the exposure interval, the exposure control 58 actuates the mirror 158 towards its light-blocking position, and actuates the film advancing apparatus 164 and the drive motor (not shown) included therein, through a path 180, to initiate the transport and processing of an exposed, self-developing film unit. The film advancing apparatus 164, in turn, moves the exposed film unit located in the cassette 162, through a path 182, into the bite of the pair of adjacent processing rollers (not shown), in the manner described above, to spread processing liquid between certain film layers and to move the exposed film unit into an exit slot (not shown) in a housing 184 of the self-developing camera 10. After the mirror 158 has been actuated to its light blocking position where it precludes the passage of light to the film plane 16, the exposure control 58 actuates the shutter drive 26 and the shutter mechanism 18 coupled thereto such that the primary or taking aperture thereof is placed in its fully opened position. After the flim advancing apparatus 164 has moved the exposed film unit through the above-mentioned pair or rollers, a film movement completion signal is routed to exposure control 58 through a path 186. Upon receipt of this film movement completion signal, the exposure control 58 initiates the charging of the electronic flash apparatus 44 through the path 168. When the main storage capacitor 46 of the electronic flash apparatus 44 is fully charged, as sensed through the path 168, the exposure control 58 places the exposure control system of the camera 10 in condition for the initiation of the next exposure cycle.

From the foregoing description of the invention it will be apparent to those skilled in the art that various improvements and modifications can be made in it without departing from its true scope. The embodiments described herein are merely illustrative and should not be viewed as the only embodiments that might encompass the invention.

What is claimed:

1. An exposure control system for photographic apparatus having means for defining a film plane and a fixed focus lens for directing light along an optical path from a scene onto photosensitive material located in the film plane, said exposure control system comprising:

a blade mechanism mounted for movement between a blocking arrangement in which said blade mechanism is in light blocking relation with respect to the optical path so as to preclude scene light from being transmitted along the optical path of the film plane and an unblocking arrangement in which said blade mechanism is in light unblocking relation with respect to the optical path so as to allow the passage of scene light to the film plane, said blade mechanism serving to provide an exposure aperture through which scene light passes and whose size varies in a predetermined manner when said blade mechanism is actuated between its said light blocking and unblocking arrangements to produce an exposure interval;

drive means for displacing said blade mechanism between its said blocking and unblocking arrangements to define said exposure interval;

a light source for illuminating the scene with artifical light that is energizable for one of more periods of time during the exposure interval;

light sensitive means for detecting light emitted by said light source and reflected from a subject within the scene during an exposure interval that is located within a range of subject distances that are closer to the photographic apparatus than the near distance of the normal depth of field of the fixed focus lens and for generating a first signal representative thereof and for detecting light emitted by said light source and reflected from a subject within the scene during an exposure interval that is located at a distance that is equal to or greater than said range of subject distances and for generating a second signal representative thereof;

means for determining if said first signal has been generated within a predetermined periof of time and for generating a third signal if said first signal is not generated within said predetermined period of time; and control means 1) for actuating said drive means to effect displacement of said blade mechanism to produce said expsoure interval, 2) for energizing said light source to produce a first illumination of the scene, for a first period of time, at a blade mechanism aperture size that is smaller than that which would normally be used for subjects located within said range of subject distances and responsive to said first or third signal for de-energizing said light source to extinguish said first illumination of the scene, and 3) for energizing said light source to produce a second illumination of the scene, for a second period of time, if said light source is de-energized in response to said third signal and responsive to said second signal to de-energize said light source to thereby extinguish said second illumination of the scene during said exposure cycle.

2. The exposure control system of claim 1 wherein said predetermined period of time starts when said control means initiates the energization of said light source to produce said first illumination of the scene.

3. The exposure control system of claim 2 wherein said predetermined period of time is equal to approximately 50 microseconds.

4. The exposure control system of claim 1 wherein said light sensitive means for generating said first signal comprises:

means for generating a reference signal representative of a subject assumed to be located within a range of distances that are nearer to the camera than the near distance of the camera lens's normal depth of field;

means for generating a signal representative of an actual subject located within said range of subject distances; and a comparator for comparing said reference signal to said actual subject signal and for generating said first signal when said actual subject signal is equal to or greater than said reference signal.

5. An exposure control system for photographic apparatus having means for defining a flim plane and a fixed focus lens for directing light along an optical path from a scene onto photosensitive material located in the film plane and having selectable close and normal subject distance modes of operation, said exposure control system comprising:

a blade mechanism mounted for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to the optical path so as to allow the passage of scene light to the film plane, said blade mechanism serving to provide an exposure aperture through which scene light passes and whose size varies in a predetermined manner when said blade mechanism is actuated between its said light blocking and unblocking arrangements to produce an exposure interval;

drive means for displacing said blade mechanism between its said blocking and unblocking arrangements to define said exposure interval;

a light source for illuminating the scene with artifical light that is energizable for one or more periods of time during the exposure interval;

light sensitive means for detecting light emitted by said light source and reflected from a subject within the scene during an exposure interval that is located within a range of subject distances that are closer to the photographic apparatus than the near distance of the normal depth of field of the fixed focus lens and for generating a subject signal representative thereof;

means for determining if said subject signal has been generated within a predetermined period of time and for generating a signal representative of the absence of a subject within said range of subject distances if said subject signal has not been generated within said predetermined period of time; and control means 1) for actuating said drive means to effect displacement of said blade mechanism to produce said exposure interval, 2) for selecting the close mode of operating including energizing said light source to illuminate the scene for a first period of time at a blade mechanism aperture size that is smaller than that which would normally be or subjects located within said range of subject distances and responsive to said subject signal or said subject absence signal for de-energized said light source, and 3) responsive to said subject absence signal for terminating the close subject distance mode of operation and for selecting the normal distance mode of operation.

6. The exposure control system of claim 5 wherein said control means further comprises means for energizing said light source for a second period of time during the exposure interval when the exposure control system is in its said normal subject distance mode of operation.

7. The exposure control system of claim 6 further comprising means for determining the size of the aperture formed by said blade mechanism at any point in time during said exposure interval and means for energizing said light source to illuminate the scene for said second period of time when the size of the aperture formed by said blade mechanism reaches some predetermined magnitude.

8. A method of forming a photographic image of a scene at a film plane of an electronic flash camera with a fixed focus lens comprising the step of:

positioning the fixed focus lens so as to direct image-carrying light rays along an optical path from the scene onto photosensitive material located in the film plane;

mounting a blade mechanism for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to the optical path so as to allow the passage of scene light to the film plane through an exposure aperture defined by the blade mechanism, said blade mechanism serving to provide an exposure aperture whose size varies in a predetermined manner when actuated between its said light blocking and unblocking arrangements to produce an exposure interval;

providing a light source for illuminating the scene with artificial light that is energizable for one of more periods of time during the exposure interval;

sensing light emitted by the light source and reflected from a subject within the scene during an exposure interval that is located within a range of subject distances that are closer to the camera than the near distance of the normal depth of field of the fixed focus lens and generating a first signal representative thereof and/or sensing light emitted by the light source and reflected from a subject within the scene during an exposure interval that is located at a distance that is greater than said range of subject distances, and generating a second signal representative thereof;

determining if said first signal has been generated within a predetermined period of time and generating a third signal if said first signal is not generated within said predetermined period of time; and actuating said blade mechanism to produce said exposure interval, energizing said light source to produce a first illumination of the scene, for a first period of time, at a blade mechanism aperture size that is smaller than that which would normally be employed for subjects located within said range of subject distances and then de-energizing said light source in response to said first or third signal to extinguish said first illumination of the scene, and energizing said light source to produce a second illumination of the scene, for a second period of time, if said light source is de-energized in response to said third signal and then de-energizing said light source to thereby extinguish said second illumination of the scene during the exposure

* * * * *

UNITED STATES PATENT AND TRADEMARK OFFICE
CERTIFICATE OF CORRECTION

PATENT NO. : 5,124,739
DATED : June 23, 1992
INVENTOR(S) : George C. Harrison

It is certified that error appears in the above—identified patent and that said Letters Patent is hereby corrected as shown below:

On the cover sheet:

Change the inventor from "Kelleher" to -- Harrison --
and from "John J. Kelleher" to -- George C. Harrison --.

Signed and Sealed this

Twenty-first Day of September, 1993

Attest:

BRUCE LEHMAN

Attesting Officer

Commissioner of Patents and Trademarks